US009612876B2

(12) United States Patent
Li et al.

(10) Patent No.: US 9,612,876 B2
(45) Date of Patent: Apr. 4, 2017

(54) METHOD AND APPARATUS FOR ESTIMATING A COMPLETION TIME FOR MAPREDUCE JOBS

(71) Applicant: Xerox Corporation, Norwalk, CT (US)

(72) Inventors: Jack Yanxin Li, Smyrna, GA (US); Gueyoung Jung, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 674 days.

(21) Appl. No.: 14/135,114

(22) Filed: Dec. 19, 2013

(65) Prior Publication Data

US 2015/0178419 A1 Jun. 25, 2015

(51) Int. Cl.
*G06F 7/60* (2006.01)
*G06F 17/10* (2006.01)
*G06F 9/50* (2006.01)

(52) U.S. Cl.
CPC .... *G06F 9/5066* (2013.01); *G06F 2209/5013* (2013.01)

(58) Field of Classification Search
CPC ................. G06F 9/5066; G06F 2209/5013

USPC ............................................... 703/2
See application file for complete search history.

(56) References Cited

U.S. PATENT DOCUMENTS

2013/0254196 A1\* 9/2013 Babu ................ G06F 17/30595
707/736

\* cited by examiner

*Primary Examiner* — Saif Alhija

(57) ABSTRACT

A method, non-transitory computer readable medium, and apparatus for estimating a completion time for a MapReduce job are disclosed. For example, the method builds a general MapReduce performance model, computes one or more performance characteristics of each one of one or more benchmark workloads, computes one or more performance characteristics of the MapReduce job in the known processing system, selects a subset of the one or more benchmark workloads that have similar performance characteristics as the one or more performance characteristics of the MapReduce job, targets a cluster of processing nodes in a distributed processing system, computes one or more performance characteristics of the subset of the one or more benchmark workloads in the cluster of processing nodes and estimates the completion time for the MapReduce job.

18 Claims, 4 Drawing Sheets

METHOD AND APPARATUS FOR ESTIMATING A COMPLETION TIME FOR MAPREDUCE JOBS

The present disclosure relates generally to calculating completion times for jobs on a distributed data intensive file system and, more particularly, to a method and an apparatus for estimating a completion time for MapReduce jobs.

BACKGROUND

MapReduce is becoming a popular programming function for processing large jobs in a distributed network of processing clusters or nodes, such as Hadoop®. Currently, there are variety of services providers offering Hadoop® cloud services, such as for example, Amazon® Elastic MapReduce, Skyptap®, Joyent®, Windows® Azure, Rackspace® and the like.

Currently, there is no fast and efficient way to estimate a cost and job completion time for MapReduce jobs. Trying to obtain a job completion time estimate and a cost estimate can be challenging because many infrastructure configurations are hidden to a user in cloud computing environments. Typically, the MapReduce jobs can be very complex and the only way to obtain a job completion time may be to run the MapReduce job itself on each cluster or service. Unfortunately, this may take a considerable amount of time to obtain an estimated cost and job completion time.

In addition, each one of the services may offer multiple types of virtual nodes with different hardware configurations and software. For example, Amazon® Elastic MapReduce may offer more than eight different types of virtual nodes in which a user can choose to run his or her MapReduce job. Thus, running the MapReduce job on each one of the vast number of available virtual nodes to obtain estimated job completion times and estimated costs would be challenging, complex and time consuming.

SUMMARY

According to aspects illustrated herein, there are provided a method, a non-transitory computer readable medium, and an apparatus for estimating a completion time for a MapReduce job. One disclosed feature of the embodiments is a method that builds a general MapReduce performance model, computes one or more performance characteristics of each one of one or more benchmark workloads in accordance with the general MapReduce performance model in a known processing system, computes one or more performance characteristics of the MapReduce job in accordance with the general MapReduce performance model in the known processing system, selects a subset of the one or more benchmark workloads that have similar performance characteristics as the one or more performance characteristics of the MapReduce job, targets a cluster of processing nodes in a distributed processing system having one or more unknown hardware configurations, computes one or more performance characteristics of the subset of the one or more benchmark workloads in the cluster of processing nodes and estimates the completion time for the MapReduce job based upon a comparative analysis of the one or more performance characteristics of the subset of the one or more benchmark workloads in the cluster of processing nodes and the one or more performance characteristics of the subset of the one or more benchmark workloads in the known processing system.

Another disclosed feature of the embodiments is a non-transitory computer-readable medium having stored thereon a plurality of instructions, the plurality of instructions including instructions which, when executed by a processor, cause the processor to perform an operation that builds a general MapReduce performance model, computes one or more performance characteristics of each one of one or more benchmark workloads in accordance with the general MapReduce performance model in a known processing system, computes one or more performance characteristics of the MapReduce job in accordance with the general MapReduce performance model in the known processing system, selects a subset of the one or more benchmark workloads that have similar performance characteristics as the one or more performance characteristics of the MapReduce job, targets a cluster of processing nodes in a distributed processing system having one or more unknown hardware configurations, computes one or more performance characteristics of the subset of the one or more benchmark workloads in the cluster of processing nodes and the completion time for the MapReduce job based upon a comparative analysis of the one or more performance characteristics of the subset of the one or more benchmark workloads in the cluster of processing nodes and the one or more performance characteristics of the subset of the one or more benchmark workloads in the known processing system.

Another disclosed feature of the embodiments is an apparatus comprising a processor and a computer readable medium storing a plurality of instructions which, when executed by the processor, cause the processor to perform an operation that builds a general MapReduce performance model, computes one or more performance characteristics of each one of one or more benchmark workloads in accordance with the general MapReduce performance model in a known processing system, computes one or more performance characteristics of the MapReduce job in accordance with the general MapReduce performance model in the known processing system, selects a subset of the one or more benchmark workloads that have similar performance characteristics as the one or more performance characteristics of the MapReduce job, targets a cluster of processing nodes in a distributed processing system having one or more unknown hardware configurations, computes one or more performance characteristics of the subset of the one or more benchmark workloads in the cluster of processing nodes and estimates the completion time for the MapReduce job based upon a comparative analysis of the one or more performance characteristics of the subset of the one or more benchmark workloads in the cluster of processing nodes and the one or more performance characteristics of the subset of the one or more benchmark workloads in the known processing system.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for estimating a completion time for a MapReduce job. As discussed above, there is no fast and efficient way to estimate a cost and job completion time for MapReduce jobs. Trying to obtain a job completion time estimate and a cost estimate can be challenging because many infrastructure configurations are hidden to a user in cloud computing environments and, thereby, such infrastructure configurations are considered as black boxes. Typically, the MapReduce jobs can be very complex and the only way to obtain a job completion time may be to run the MapReduce job itself on each cluster or service in a black box environment. Unfortunately, this may take a considerable amount of time to obtain an estimated cost and job completion time.

One embodiment of the present disclosure provides a fast and efficient way for providing estimation of completion times for a MapReduce job. In one embodiment, a general MapReduce performance model can be built that may be used to obtain one or more performance characteristics of benchmark workloads and one or more performance characteristics of a MapReduce job. The benchmark workloads that have similar performance characteristics as the MapReduce job may be used in the black box or distributed processing systems with unknown hardware configurations to estimate a completion time for the MapReduce job with comparative analysis. Since the benchmark workloads are available in the distributed processing systems and much simpler than the MapReduce jobs, the benchmark workloads take only a few minutes to complete to obtain an estimated completion time as opposed to the potential hours of a full-blown MapReduce job. The estimated completion time may then be normalized and used to obtain an estimated completion time for the MapReduce job itself in the black box.

Figure 1:
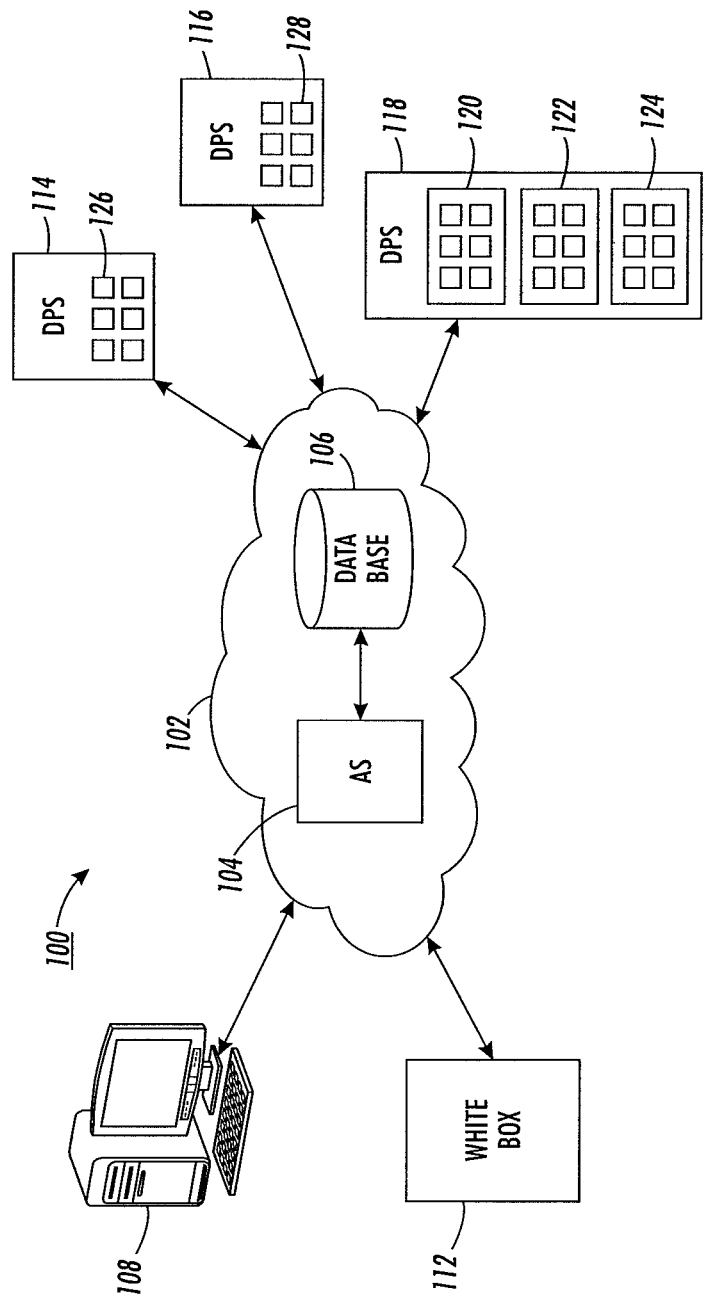
FIG. 1 illustrates an example block diagram of a communication network of the present disclosure.

FIG. 1 illustrates an example communications network 100 of the present disclosure. In one embodiment, the communications network 100 may include an Internet Protocol (IP) network 102. The IP network 102 may include an application server (AS) 104 and a database (DB) 106. The IP network 102 may include other network elements, such as for example, border elements, firewalls, routers, switches, and the like that are not shown for simplicity.

In one embodiment, the AS 104 may perform various functions disclosed herein and be deployed as a server or a general purpose computer described below in FIG. 4. In one embodiment, the DB 106 may store various information. For example, the DB 106 may store pre-defined benchmark workloads. The benchmark workloads may be simple jobs that may take only a few minutes to complete compared to potentially hours of MapReduce jobs that are typically large complex jobs. In one embodiment, the DB 106 may store one or more performance characteristics of the benchmark workloads that have been tested in the white box (described below) or various targeted clusters of processing nodes in the black boxes (described below). In one embodiment, the DB 106 may store one or more performance characteristics of previously submitted MapReduce jobs that have been executed. In one embodiment, the DB 106 may store the general MapReduce performance model that is built and applied in the present disclosure.

In one embodiment, a user may use an endpoint 108 to submit a request to complete a MapReduce job. The MapReduce job is generally performed on a cluster of processing nodes in parallel in a distributed processing system (DPS). In one embodiment, the MapReduce job may be submitted to the AS 104 to broker the transaction between a white box 112 or the DPSs 114, 116, 118 or submitted directly to the white box 112 or the DPSs 114, 116, 118. In one embodiment, the endpoint 108 may be any type of endpoint device, include for example, a desktop computer, a laptop computer, a netbook computer, a tablet computer, a smart phone, and the like. A MapReduce job may be a processing job that takes large amounts of data and performs a map procedure that filters and sorts and a reduce procedure that performs a summary operation.

In one embodiment, the IP network 102 may be in communication with one or more DPSs 114, 116 and 118. The DPSs 114, 116 and 118 may be any type of distributed processing system that uses a distributed file system (DFS) such as, for example, Hadoop HDFS®. Although three DPSs 114, 116 and 118 are illustrated in FIG. 1, it should be noted that any number of distributed processing systems may be deployed. In one embodiment, each one of the DPSs 114, 116 and 118 may include a cluster of processing nodes 126, 128, 120, 122 and 124, respectively. One or more of the DPSs 114, 116 and 118 may include a plurality of different clusters of processing nodes (e.g., a cluster of processing nodes 120, 122 and 124 in the DPS 118).

However, the DPSs 114, 116 and 118 may also be referred to as a black box or a black box environment. The DPSs 114, 116 and 118 typically have unknown hardware configurations. For example, the user will typically not know how much processing power, how much processing capability, the internal network configurations, how much memory and how much diskspace is available in any of the DPSs 114, 116 and 118 or cluster of processing nodes 120, 122, 124, 126 and 128 within a DPS. The user will also not know how the processing nodes are configured or programmed to operate. In addition, the DPSs 114, 116 and 118 may have hardware equipment periodically upgraded or re-configured without any notice to the users.

As a result, obtaining an estimated completion time and cost for the MapReduce job may be difficult because the user does not know anything about the hardware configuration of the cluster of processing nodes 120, 122, 124, 126 and 128 of DPSs 114, 116 and 118. Currently, to obtain an estimated completion time and cost, the user would be required to submit the MapReduce job itself to each DPS 114, 116 and 118 to perform a sample run which may take several hundred minutes or hours to complete given the large size and complexity of the MapReduce job.

In one embodiment, to provide a more efficient method for estimating a completion time and cost to process a MapReduce job, the user may submit the MapReduce job to the white box 112. In one embodiment, the white box 112 may be a processing platform or processing hardware where all of the hardware configurations are known. In other words, the white box 112 may be a known processing system.

In one embodiment, one or more benchmark workloads may be processed in the white box 112 and the MapReduce job may also be processed in the white box 112. The benchmark workloads may be much smaller jobs that are pre-defined and available in the DPSs 114, 116 and 118. The benchmark workloads may be various types of simple MapReduce jobs that only take a few minutes to process as opposed to several hundred minutes to hours that the MapReduce job may take to process (e.g., benchmark workloads found in the HiBench® suite of Hadoop®).

In one embodiment, the benchmark workloads and the MapReduce job may be processed in accordance with a general MapReduce performance model that is built for the purpose of identifying one or more performance characteristics of the benchmark workloads and the MapReduce job. In one embodiment, those benchmark workloads having similar characteristics as the one or more performance characteristics of the MapReduce job may be used to process on one or more targeted cluster of processing nodes 120, 122, 124, 126 or 128 to obtain estimated completion times and estimated costs for each desired cluster of processing nodes 120, 122, 124, 126 or 128 in the black box environment. Since the benchmark workloads have similar characteristics to the MapReduce job, the estimated completion times and estimated costs may be used to estimate the completion time or costs for the MapReduce job by comparing the benchmark results of the black box and the white box.

In one embodiment, the general MapReduce model may be defined by Equation 1 below:

$$\text{Total Time}=\text{MapPhaseDuration}+\text{ShufflePhaseDuration}+\text{ReducePhaseDuration}-\text{Overlap Duration}, \quad \text{Eq. 1:}$$

In one embodiment, the Reduce Phase Duration may be combined with the Shuffle Phase Duration for some distributed processing systems. However, some distributed processing systems (e.g., Hadoop®) separately process the Shuffle Phase and the Reduce Phase.

In one embodiment, the Map Phase Duration may be calculated in accordance with Equation 2 below:

$$MapPhaseDuration = \frac{\sum_{i=1}^{M} MapTaskDuration_i}{n*m}, \quad \text{Eq. 2}$$

where M is a total number of tasks, $MapTaskDuration_i$ is a duration of a map task i, n is a total number of nodes (e.g., cluster of processing nodes 120, 122, 124, 126 or 128) and m is a number of map slots available per node.

In one embodiment, the ith Map Task Duration may be calculated using Equation 3 below:

$$MapTaskDuration_i=(FS_{readi}+FS_{writei}+HDFS_{readi}+HDFS_{writei}+CPU_i), \quad \text{Eq. 3:}$$

where $FS_{readi}$ is a time to read the ith local disk file system (FS), $FS_{writei}$ is a time to write to the ith local disk file system, $HDFS_{readi}$ is a time to read the ith distributed file system file (e.g., Hadoop® distributed file system), $HDFS_{writei}$ is a time to write to the ith distributed file system file and $CPU_i$ is a time spent by the processor during each map task i for a given job.

In one embodiment, the $CPU_i$ may be calculated by timing each map task completion time. Each remaining component of Equation 3 may be calculated by first running a DFSIO-E benchmark, which measures the total input/output (I/O) throughput of the cluster. The time from the DFSIO-E benchmark can be used to calculate the time the cluster spent writing to and reading from HDFS. Then a separate file system micro-benchmark, such as Filebench, may be run to determine the write and read throughputs of FS on each node in the cluster. The times for each component may then be used to further convert Equation 3 into Equation 4 below:

$$MapTaskDuration_i(Speed_{FSreadi} \times Size_{FSreadi} + Speed_{FSwritei} \times Size_{FSwritei} + Speed_{HDFSreadi} \times Size_{HDFSreadi} + Speed_{HDFSwritei} \times Size_{HDFSwritei} + CPU_i). \quad \text{Eq. 4:}$$

In one embodiment, if the reduce phase is performed separately from the shuffle phase, the Reduce Phase Duration may be broken down identically to the Map Phase Duration as illustrated above in Equations 1-4.

In one embodiment, the Shuffle Phase Duration may have two phases. The two phases may be time spent shuffling data in the network and time to write the data to the local file disk (FS). The Shuffle Phase Duration may be calculated using Equation 5 below:

$$ShuffleTaskDuration_i=(ShuffleTime_i+FS_{writei}), \quad \text{Eq. 5:}$$

In one embodiment, the $ShuffleTime_i$ may be estimated by extracting an end timestamp of each map task and a start timestamp of each reduce task from the MapReduce log. In one embodiment, the $ShuffleTime_i$ may be a function of a network I/O time, a local disk read time and a CPU processing time. Then the total time of each phase may be calculated using Equation 6 below:

$$ShufflePhaseDuration = \frac{\sum_{i=1}^{M} ShuffleTaskDuration_i}{n*m}, \quad \text{Eq. 6}$$

Lastly, the Overlap Duration between any reduce task or shuffle task and map tasks must be subtracted from the total completion time as shown in Equation 1. In one embodiment, the Overlap Duration may be calculated using Equation 7 below:

$$\text{Overlap Duration}=Max(EndTime_{MapTaski})-Min(StartTime_{ShuffleTaski}), \quad \text{Eq. 7:}$$

Notably, the currently used methods for estimating completion times do not account for the overlap time. Thus, the currently used methods provide inaccurate estimated completion times.

Figure 2:
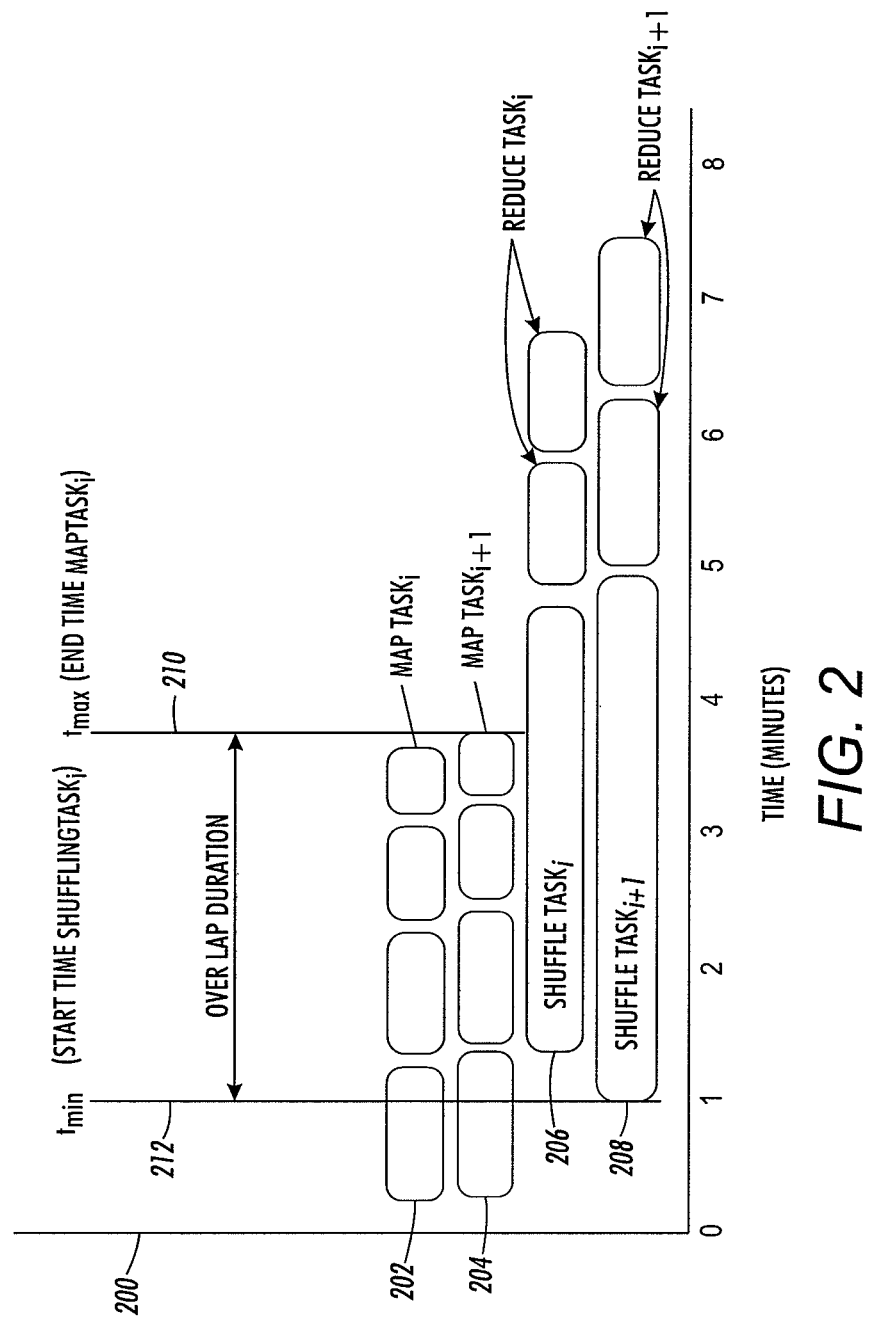
FIG. 2 illustrates an example block diagram of a MapReduce job.

FIG. 2 illustrates visually the Overlap Duration using a block diagram 200 of a MapReduce job being processed in a distributed processing system. The block diagram 200 illustrates a line of tasks 202, 204, 206 and 208 being performed by two parallel processors in a distributed processing system (e.g., DPSs 114, 116 or 118). In one embodiment, a first processor may be performing tasks 202 and 206 and a second processor may be performing tasks 204 and 208.

In one embodiment, tasks 202 and 204 may be a mapping function or mapping algorithm. In one embodiment, the tasks 206 and 208 may be a shuffle function or shuffle algorithm and a reduce function or reduce algorithm. In one embodiment, the shuffle tasks may include the reduce function or reduce algorithms.

In one embodiment, FIG. 2 graphically illustrates how the Overlap Duration in Equations 1 and 7 is calculated. For example, the map tasks 202 and 204 may have different ending times. The maximum ending time represented by line 210 may represent $Max(EndTime_{MapTaski})$. In addition, the shuffle tasks 206 and 208 may have different starting times. The minimum starting time represented by line 212 may represent $Min(StartTime_{ShuffleTaski})$. Thus, the difference in time between the lines 210 and 212 is equal to the Overlap Duration used in Equation 1.

Based upon the values for each component of the general MapReduce performance model in Equation 1, each benchmark workload and the MapReduce job processed in the white box 112 may be summarized as a vector of components from Equations 2-7. In one embodiment, the vector of values, V, may be represented by Equation 8 below:

$$V = [FS_{read}^{map}, FS_{write}^{map}, HDFS_{read}^{map}, HDFS_{write}^{map},$$
$$CPU^{map}, ShuffleTime, FS_{write}^{shuffle}, FS_{read}^{reduce},$$
$$FS_{write}^{reduce}, HDFS_{read}^{reduce}, HDFS_{write}^{reduce},$$
$$CPU^{reduce}, OverlapTime], \quad \text{Eq. 8:}$$

where each component is defined from Equations 2-7 above. In one embodiment, the vector V may be normalized so that the components of each one of the vectors of each benchmark workload and the MapReduce job can be compared to find similar performance characteristics. For example, the normalization may comprise dividing each component by a total execution time of a respective benchmark workload or the MapReduce job.

Using the vector, a similarity between each component of the vector for the MapReduce job and each component of the vector for each benchmark workload may be calculated. In one embodiment, a Euclidean Distance algorithm or a Cosine Similarity algorithm may be used to calculate the similarity.

In one embodiment, a vector of a benchmark workload and the MapReduce job may be considered to be similar when a number of the components within the vector having a distance within a distance threshold is above a threshold. For example, the distance threshold may be 0.1 and the threshold for a number of components may be 10. One vector may have 11 components having a distance to a corresponding component of the vector of the MapReduce job within 0.1. Thus, the vector may be considered to be similar to the MapReduce job. In another embodiment, similar may be defined as requiring all components of the vector to be within the distance threshold. It should be noted that the distance threshold of 0.1 and the threshold for the number of components used above are only examples and the thresholds may be set to any desired value appropriate for a particular application.

In one embodiment, a subset of the benchmark workloads may be selected based upon the similarity to the MapReduce job to be used to estimate the completion time and costs for the MapReduce job. For example, based upon the normalized values, the benchmark workloads may then be tested in the cluster of nodes 120, 122, 124, 126 and 128 of the DPSs 114, 116 and 118 to estimate completion times and costs. Since the benchmark workloads have similar performance characteristics as the MapReduce job, the estimated completion times and costs for the benchmark workloads may be used as the estimated completion time and costs for the MapReduce job by comparing the benchmark results between the black box and the white box.

In one embodiment, the estimated completion time may be calculated for the MapReduce job using Equation 9 below:

$$\text{Estimated Completion Time} = \sum_j (V^{unknown} \cdot C_j / V^{known} \cdot C_j) V_{job}^{known} \cdot C_j, \quad \text{Eq. 9}$$

wherein j is a jth component of the vector, $V^{unknown} \cdot C_j$ is an average time value of the each component of a respective vector of each one of the subset of the one or more benchmark workloads that is measured in the cluster of the distributed processing system (e.g., one of the cluster of nodes 120-128 of DPSs 114, 116 or 118), $V^{known} \cdot C_j$ is an average time value of the each component of the respective vector for the each one of the subset of the one or more benchmark workloads that is measured in the known processing system (e.g., the white box 112) and $V_{job}^{known} \cdot C_j$ is an average time value of the each component of the vector for the MapReduce job measured in the known processing system (e.g., the white box 112).

In one embodiment, each benchmark workload that is run and the MapReduce job that is run may have the estimated completion times and costs stored in the DB 106 for future reference. For example, the estimated completion times and costs may be provided immediately without the need to test them in the black box environment if the DB 106 has times and costs recorded for previously run benchmark workloads and MapReduce jobs that are similar to a new MapReduce job.

Figure 3:
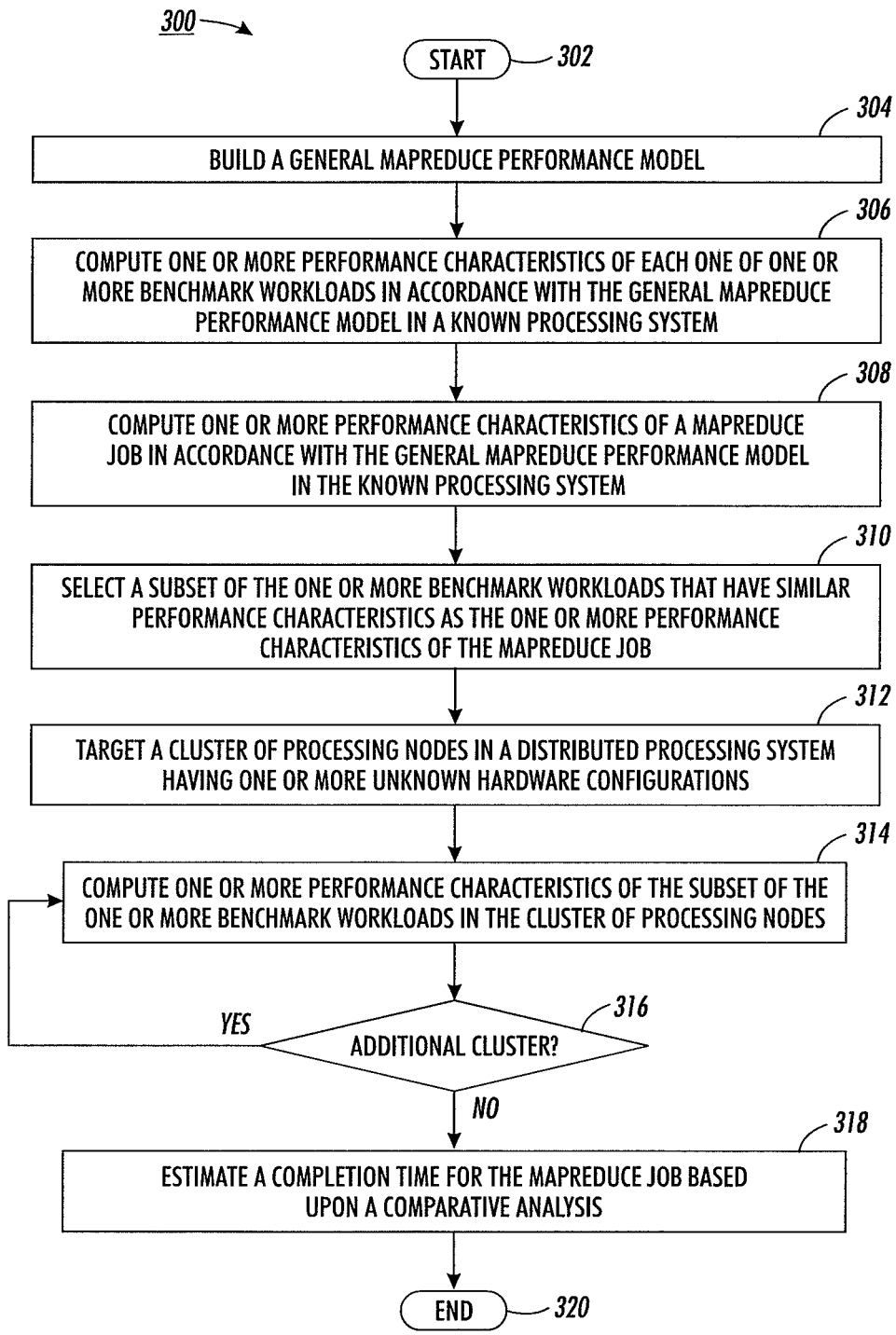
FIG. 3 illustrates an example flowchart of a method for estimating a completion time for a MapReduce job.

FIG. 3 illustrates a flowchart of a method 300 for estimating a completion time for a MapReduce job. In one embodiment, one or more steps or operations of the method 300 may be performed by the AS 104 or a general-purpose computer as illustrated in FIG. 4 and discussed below.

At step 302 the method 300 begins. At step 304, the method 300 builds a general MapReduce performance model. In one embodiment, the general MapReduce performance model may be Equation 1 described above.

At step 306, the method 300 computes one or more performance characteristics of each one of one or more benchmark workloads in accordance with the general MapReduce performance model in a known processing system. For example, the general MapReduce performance model may be a function of Map Phase Duration, Shuffle Phase Duration, Reduce Phase Duration and Overlap Duration as described by Equation 1. Each component of the general MapReduce performance model may be broken down into further components as illustrated by the vector in Equation 8 described above. Each component of the vector in Equation 8 may correspond to the performance characteristics of the benchmark workloads.

In one embodiment, the benchmark workloads may be various types of MapReduce jobs that only take a few minutes to process as opposed to several hundred minutes to hours that the MapReduce job may take to process (e.g., benchmark workloads found in the HiBench® suite of Hadoop®). In one embodiment, the known processing system may be the white box 112 illustrated in FIG. 1, where all of the hardware parameters and configurations of the processing system are known.

At step 308, the method 300 computes one or more performance characteristics of a MapReduce job in accordance with the general MapReduce performance model in the known processing system. For example, the MapReduce performance model may be processed one time in the known processing system (e.g., the white box 112 in FIG. 1) to obtain the values for each one of the components of the vector described by Equation 8.

At step 310, the method 300 selects a subset of the one or more benchmark workloads that have similar performance characteristics as the one or more performance characteristics of the MapReduce job. Using the vector, a similarity between each component of the vector for the MapReduce job and each component of the vector for each benchmark workload may be calculated. In one embodiment, a Euclidean Distance algorithm or a Cosine Similarity algorithm may be used to calculate the similarity.

In one embodiment, a vector of a benchmark workload and the MapReduce job may be considered to be similar when a number of the components within the vector having a distance within a distance threshold is above a threshold. For example, the distance threshold may be 0.1 and the threshold for a number of components may be 10. One vector may have 11 components having a distance to a corresponding component of the vector of the MapReduce job within 0.1. Thus, the vector may be considered to be similar to the MapReduce job. In another embodiment, similar may be defined as requiring all components of the vector to be within the distance threshold. It should be noted that the distance threshold of 0.1 and the threshold for the number of components used above are only examples and the thresholds may be set to any desired value appropriate for a particular application.

In one embodiment, the subset may include a single benchmark workload of the one or more benchmark workloads that are processed in the known processing system. In another embodiment, the subset may include more than one or a plurality of benchmark workloads.

At step 312, the method 300 targets a cluster of processing nodes in a distributed processing system having one or more unknown hardware configurations. For example, a user may input which cluster of processing nodes he or she would potentially like to use to process the MapReduce job. The cluster of processing nodes may be part of a black box environment or distributed processing system where the hardware configurations are unknown. In other words, the processing power, the processing capability, available memory, and the like are unknown. In addition, the user may not know how the processing nodes are configured or programmed to operate.

At step 314, the method 300 computes one or more performance characteristics of the subset of the one or more benchmark workloads in the cluster of processing nodes. For example, rather than requiring the MapReduce job to be test run on each cluster of processing nodes that is targeted, which may take hundreds of minutes to hundreds of hours to complete due to the size and complexity of the MapReduce job, the method 300 runs the benchmark workloads that are much simpler and only take a few minutes to complete. In addition, since the subset of benchmark workloads are similar in performance characteristics as the MapReduce job, the estimated completion time and costs obtained from running the subset of benchmark workloads in the cluster of processing nodes that are targeted in the unknown processing system can be correlated to the estimated completion time and costs for the MapReduce job.

At step 316, the method 300 determines if there are any additional clusters that are targeted. If there are additional clusters that are targeted, the method 300 returns to step 314 for the additional cluster. However, if no additional clusters are targeted, then the method 300 may proceed to step 318.

At step 318, the method 300 estimates a completion time for the MapReduce job based upon a comparative analysis of the one or more performance characteristics of the subset of the one or more benchmark workloads in the cluster of processing nodes and the one or more performance characteristics of the subset of the one or more benchmark workloads in the known processing system. In one embodiment, the estimated completion time can be calculated using Equation 9 described above for each cluster of processing nodes that is targeted and used to process the subset of the benchmark workloads.

As a result, the method 300 provides a faster and more efficient way of providing an estimated completion time and costs for MapReduce jobs than is currently available. At step 320, the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

Figure 4:
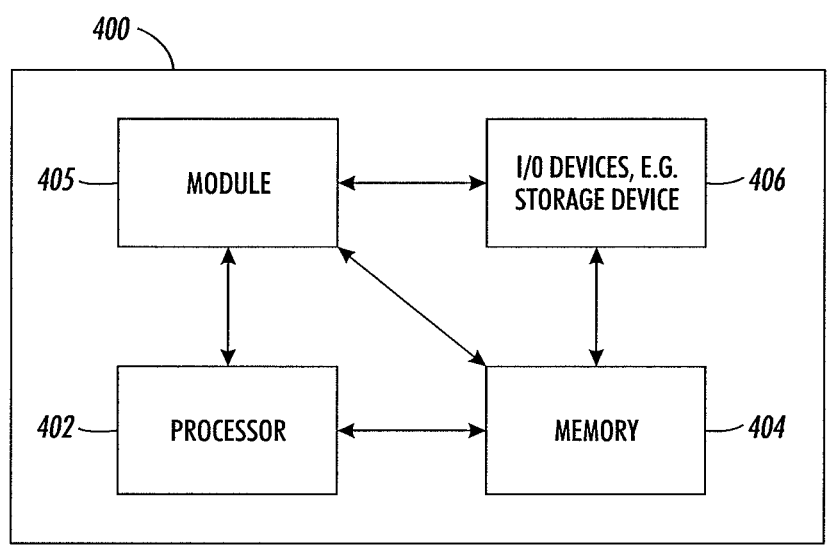
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a SIMD, a CPU, and the like), a memory 404, e.g., random access memory (RAM) and/or read only memory (ROM), a module 405 for estimating a completion time for a MapReduce job, and various input/output devices 306 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 405 for estimating a completion time for a MapReduce job can be loaded into memory 404 and executed by processor 402 to implement the functions as discussed above. As such, the present method 405 for estimating a completion time for a MapReduce job (including associated data structures) of the present disclosure can be stored on a non-transitory (e.g., physical and tangible) computer readable storage medium, e.g., RAM memory, magnetic or optical drive or diskette and the like. For example, the hardware processor 402 can be programmed or configured with instructions (e.g., computer readable instructions) to perform the steps, functions, or operations of method 300.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for estimating a completion time for a MapReduce job, comprising:
   building, by a processor, a general MapReduce performance model;
   computing, by the processor, one or more performance characteristics of each one of one or more benchmark workloads in accordance with the general MapReduce performance model in a known processing system;

computing, by the processor, one or more performance characteristics of the MapReduce job in accordance with the general MapReduce performance model in the known processing system;

selecting, by the processor, a subset of the one or more benchmark workloads that have similar performance characteristics as the one or more performance characteristics of the MapReduce job;

targeting, by the processor, a cluster of processing nodes in a distributed processing system having one or more unknown hardware configurations;

computing, by the processor, one or more performance characteristics of the subset of the one or more benchmark workloads in the cluster of processing nodes; and estimating, by the processor, the completion time for the MapReduce job based upon a comparative analysis of the one or more performance characteristics of the subset of the one or more benchmark workloads in the cluster of processing nodes and the one or more performance characteristics of the subset of the one or more benchmark workloads in the known processing system.

2. The method of claim 1, wherein the general MapReduce performance model comprises a total time as a function of a sum of a map phase duration, a shuffle phase duration and a reduce phase duration minus an overlap duration.

3. The method of claim 2, wherein the map phase duration comprises a sum of a local disk file system read time, a local disk file system write time, a distributed file system read time, a distributed file system write time and computer processing unit processing time.

4. The method of claim 2, wherein the shuffle phase duration comprises a sum of a network input/output time, a local disk file system read time, a computer processing unit processing time and a local disk file system write time.

5. The method of claim 2, wherein the reduce phase duration comprises a sum of a local disk file system read time, a local disk file system write time, a distributed file system read time, a distributed file system write time and computer processing unit processing time.

6. The method of claim 2, wherein the overlap duration comprises a maximum end time of one of a plurality map tasks operating in parallel minus a minimum start time of one of a plurality of shuffle tasks operating in parallel.

7. The method of claim 1, wherein the one or more benchmark workloads are pre-defined benchmarks in the distributed processing system.

8. The method of claim 1, wherein the selecting comprises:

calculating, by the processor, a distance between a vector of time values for each component of the general MapReduce performance model for each one of the one or more benchmark workloads to a vector of time values for each component of the general MapReduce performance model of the MapReduce job; and selecting, by the processor, at least one of the one or more benchmark workloads to include in the subset that has the distance below a first threshold of a number of components above a second threshold.

9. The method of claim 8, wherein the distance is calculated using at least one of a Euclidean Distance or a Cosine Similarity.

10. The method of claim 1, wherein the completion time that is estimated is estimated using a comparative analysis that is a function of an average time value of each component of each vector of each one of the subset of the one or more benchmark workloads that is measured in the cluster of the distributed processing system, an average time value of the each component of the each vector measured in the known processing system and an average time value of the each component of the vector of the MapReduce job measured in the known processing system.

11. The method of claim 1, further comprising:

computing, by the processor, an additional one or more performance characteristics of the subset of the one or more benchmark workloads in a plurality of different clusters of processing nodes;

estimating, by the processor, the completion time for each one of the plurality of different clusters; and recommending, by the processor, one of the plurality of different clusters having a shortest completion time.

12. A non-transitory computer-readable medium storing a plurality of instructions which, when executed by a processor, cause the processor to perform operations for estimating a completion time for a MapReduce job, the operations comprising:

building a general MapReduce performance model;

computing one or more performance characteristics of each one of one or more benchmark workloads in accordance with the general MapReduce performance model in a known processing system;

computing one or more performance characteristics of the MapReduce job in accordance with the general MapReduce performance model in the known processing system;

selecting a subset of the one or more benchmark workloads that have similar performance characteristics as the one or more performance characteristics of the MapReduce job;

targeting a cluster of processing nodes in a distributed processing system having one or more unknown hardware configurations;

computing one or more performance characteristics of the subset of the one or more benchmark workloads in the cluster of processing nodes; and estimating the completion time for the MapReduce job based upon a comparative analysis of the one or more performance characteristics of the subset of the one or more benchmark workloads in the cluster of processing nodes and the one or more performance characteristics of the subset of the one or more benchmark workloads in the known processing system.

13. The non-transitory computer-readable medium of claim 12, wherein the general MapReduce performance model comprises a total time as a function of a sum of a map phase duration, a shuffle phase duration and a reduce phase duration minus an overlap duration.

14. The non-transitory computer-readable medium of claim 12, wherein the selecting comprises:

calculating a distance between a vector of time values for each component of the general MapReduce performance model for each one of the one or more benchmark workloads to a vector of time values for each component of the general MapReduce performance model of the MapReduce job; and selecting at least one of the one or more benchmark workloads to include in the subset that has the distance below a first threshold of a number of components above a second threshold.

15. The non-transitory computer-readable medium of claim 14, wherein the distance is calculated using at least one of a Euclidean Distance or a Cosine Similarity.

16. The non-transitory computer-readable medium of claim 12, wherein the completion time that is estimated is estimated using a comparative analysis that is a function of an average time value of each component of each vector of each one of the subset of the one or more benchmark workloads that is measured in the cluster of the distributed processing system, an average time value of the each component of the each vector measured in the known processing system and an average time value of the each component of the vector of the MapReduce job measured in the known processing system.

17. The non-transitory computer-readable medium of claim 12, further comprising:
   computing an additional one or more performance characteristics of the subset of the one or more benchmark workloads in a plurality of different clusters of processing nodes;
   estimating the completion time for each one of the plurality of different clusters; and
   recommending one of the plurality of different clusters having a shortest completion time.

18. A method for estimating a completion time for a MapReduce job, comprising:
   building, by a processor, a general MapReduce performance model that is represented by a first function, Total Time=Map Phase Duration+Shuffle Phase Duration+Reduce Phase Duration−Overlap Duration, wherein the function may be represented by a vector comprising each component of the Map Phase Duration, the Shuffle Phase Duration, the Reduce Phase duration and the Overlap Duration, the vector represented by an expression, $V = [FS_{read}^{map}, FS_{write}^{map}, HDFS_{read}^{map}, HDFS_{write}^{map}, CPU^{map}, ShuffleTime, FS_{write}^{shuffle}, FS_{read}^{reduce}, FS_{write}^{reduce}, HDFS_{read}^{reduce}, HDFS_{write}^{reduce}, CPU^{reduce}, OverlapTime];$ computing, by the processor, a time value for each component of the vector for each one of one or more benchmark workloads in a known processing system;
   computing, by the processor, a time value for each component of the vector for the MapReduce job in the known processing system;
   calculating, by the processor, a distance between the time value of the each component of the vector for each one of the one or more benchmark workloads and the time value of each component of the vector for the MapReduce job;
   selecting, by the processor, a subset of the one or more benchmark workloads that have similar performance characteristics as the MapReduce job based upon the subset of the one or more benchmark workloads having the most components with the distance below a threshold;
   targeting, by the processor, a cluster of processing nodes in a distributed processing system having one or more unknown hardware configurations;
   computing, by the processor, a time value of the each component of the vector of each one of the subset of the one or more benchmark workloads in the cluster of processing nodes; and
   estimating, by the processor, the completion time for the MapReduce job based upon the time value of the each component of the vector of the each one of the subset of the one or more benchmark workloads, wherein the completion time is estimated using a second function, $$\text{Estimated Completion Time} = \sum_j (V^{unknown} \cdot C_j / V^{known} \cdot C_j) V_{job}^{known} \cdot C_j,$$

wherein j is a jth component of the vector, $V^{unknown} \cdot C_j$ is an average time value of the each component of a respective vector of each one of the subset of the one or more benchmark workloads that is measured in the cluster of the distributed processing system, $V^{known} \cdot C_j$ is an average time value of the each component of the respective vector for the each one of the subset of the one or more benchmark workloads that is measured in the known processing system and $V_{job}^{known} \cdot C_j$ is an average time value of the each component of the vector for the MapReduce job measured in the known processing system.

* * * * *